United States Patent
Bouchene et al.

(10) Patent No.: US 12,502,444 B2
(45) Date of Patent: Dec. 23, 2025

(54) SANITIZATION USING LIGHT

(71) Applicants: STMICROELECTRONICS (GRENOBLE 2) SAS, Grenoble (FR); STMICROELECTRONICS S.r.l., Agrate Brianza (IT)

(72) Inventors: Salim Bouchene, Seyssinet-Pariset (FR); Jean Camiolo, St Egrêve (FR); Roberto La Rosa, Viagrande (IT)

(73) Assignees: STMICROELECTRONICS (GRENOBLE 2) SAS, Grenoble (FR); STMICROELECTRONICS S.r.l., Agrate Brianza (IT)

( * ) Notice: Subject to any disclaimer, the term of this patent is extended or adjusted under 35 U.S.C. 154(b) by 776 days.

(21) Appl. No.: 17/860,965

(22) Filed: Jul. 8, 2022

(65) Prior Publication Data

US 2023/0021993 A1 Jan. 26, 2023

(30) Foreign Application Priority Data

Jul. 23, 2021 (FR) ...................................... 2108025

(51) Int. Cl.
*A61L 2/10* (2006.01)
*A61L 2/24* (2006.01)
*H05B 45/12* (2020.01)

(52) U.S. Cl.
CPC .................... *A61L 2/10* (2013.01); *A61L 2/24* (2013.01); *H05B 45/12* (2020.01)

(58) Field of Classification Search
CPC .......... A61L 2/10; A61L 2/24; A61L 2202/25; H05B 45/12; H05B 45/22; H05B 45/46; H05B 47/155
See application file for complete search history.

(56) References Cited

U.S. PATENT DOCUMENTS

| | | | |
|---|---|---|---|
| 2007/0023710 A1* | 2/2007 | Tom ......................... | A61L 2/10 422/62 |
| 2014/0055039 A1* | 2/2014 | Huang .................... | H05B 45/12 315/151 |
| 2017/0080117 A1* | 3/2017 | Gordon ................... | A61L 2/084 |
| 2018/0193502 A1 | 7/2018 | Ufkes | |
| 2018/0264151 A1 | 9/2018 | Shur et al. | |
| 2019/0200424 A1 | 6/2019 | Mochizuki et al. | |
| 2020/0305248 A1* | 9/2020 | Nickles ..................... | A61L 2/10 |

* cited by examiner

*Primary Examiner* — Jennifer Wecker
*Assistant Examiner* — Brady C Pilsbury
(74) *Attorney, Agent, or Firm* — Seed Intellectual Property Law Group LLP (57) ABSTRACT

The present disclosure relates to a method for sanitization of a surface by emission of a plurality of sanitization wavelengths, and to a device for implementing the method. The method comprises emitting light using first LEDs configured to emit the sanitization wavelengths, receiving, by a circuit, a feedback signal from a light sensor indicating a light intensity received by the light sensor during the light emission, and controlling the first LEDs with the circuit based on the feedback signal.

20 Claims, 3 Drawing Sheets

SANITIZATION USING LIGHT

BACKGROUND

Technical Field

The present disclosure generally relates to electronic devices and circuits, and, more specifically, to devices and methods for sanitization using light.

Description of the Related Art

Electronic devices and methods for sanitization of a surface using light are known. In these known devices and methods, light is emitted at specific wavelengths toward a surface to be sanitized.

BRIEF SUMMARY

A method for sanitization of a surface using light and a device for sanitization of a surface using light are provided. A device and a method for sanitization of a surface using light which is safe for a user are provided. A device and a method for sanitization of a surface using light having a lower power consumption are provided. A device and a method for sanitization of a surface using light which ensure that the surface is effectively sanitized are provided.

One embodiment provides a method for sanitization of a surface by emission of a plurality of sanitization wavelengths, comprising emitting light using first LEDs configured to emit said sanitization wavelengths, receiving, by a circuit, a feedback signal from a light sensor indicating a light intensity received by the light sensor during the light emission, and controlling the first LEDs with the circuit based on the feedback signal.

According to one embodiment, the method comprises: detecting, with the circuit and based on the feedback signal, that at least one of said sanitization wavelengths was not emitted by the first LEDs; and
in response to the detection that at least one of said sanitization wavelengths was not emitted, controlling with the circuit an end of the light emission by the first LEDs.

According to one embodiment, the method further comprises, alerting a user in response to the detection that at least one of said sanitization wavelengths was not emitted.

According to one embodiment, detecting that at least one of said sanitization wavelength was not emitted comprises, for each sanitization wavelength, comparing with a threshold an intensity of the light received by the light sensor at said sanitization wavelength.

According to one embodiment, the method comprises: detecting, with the circuit and based on the feedback signal, that the first LEDs emit light with wavelengths shifted compared to said sanitization wavelengths; and modifying, with the circuit, the control of the first LEDs to suppress the wavelengths shift.

According to one embodiment, suppressing the wavelengths shift comprises modifying, with the circuit and for each first LED, a current flowing through said first LED when said first LED emits light.

According to one embodiment, detecting that wavelengths emitted by the first LEDs are shifted compared to said sanitization wavelengths comprises comparing, with a pattern of intensity, an intensity of the light received by the sensor when the first LEDs emit light.

According to one embodiment, the method further comprises receiving, by the circuit, a supplementary feedback signal provided by the light sensor which indicates a light intensity received by the light sensor when no light is emitted by the first LEDs, and wherein the control of the first LEDs by the circuit is further based on said supplementary feedback signal.

According to one embodiment, the circuit modifies a duration of the light emission by the first LEDs so that, for each of said sanitization wavelengths, a power of the light received by the sensor during the light emission is equal to a target value.

According to one embodiment, the circuit decreases the duration of the light emission when, for each first LED, the circuit controls an increase of the current flowing through the first LED, and the circuit increases the duration of the light emission when, for each first LED, the circuit controls a decrease of the current flowing through the first LED.

According to one embodiment, the circuit, based on the feedback signal and on the supplementary feedback signal:
  determines for each of said sanitization wavelengths a contribution of the ambient light to the power of light received by the light sensor during the light emission by the first LEDs;
  decreases the duration of the light emission when said contribution increases; and
  increases the duration of the light emission when said contribution decreases.

According to one embodiment, during the light emission by the first LEDs, the circuit controls the light emitted by each first LED by controlling a value of a voltage applied across the first LED.

According to one embodiment, the method further comprises controlling, by the circuit, second LEDs configured to emit light with wavelengths different from said sanitization wavelengths.

According to one embodiment, said sanitization wavelengths are comprised in a wavelength range from 400 nanometers (nm) to 420 nm, and, preferably, comprise a first wavelength equal to 405 nm, a second wavelength equal to 410 nm and a third wavelength equal to 415 nm.

One embodiment provides a device for sanitization of a surface by emission of a plurality of sanitization wavelengths comprising:
  first LEDs configured to emit said sanitization wavelengths; a light sensor configured to provide a feedback signal indicating intensity of the light received by the light sensor during a phase of light emission by the first LEDs; and
  a circuit configured to receive the feedback signal and to control the first LEDs based on said feedback signal.

According to one embodiment, the device is configured to implement the above described method.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the usual applications and systems where a device and/or a method for sanitizing a surface using light may be implemented have not been detailed, the described embodiments and variants being compatible with these usual applications and systems.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

When light is emitted toward a surface to sanitize the surface, the light is emitted with given wavelengths allowing the surface to be sanitized. According to an embodiment, these wavelengths are comprised in the range from 400 nm to 420 nm. Indeed, wavelengths in this range are particularly efficient to kill bacteria and/or virus which may be present on a surface, for example for killing SARS-CoV-2 viruses. According to an embodiment, these given wavelengths comprise a first wavelength equal to 405 nm, and second wavelength equal to 410 nm, and a third wavelength equal to 415 nm.

The light is emitted using light emitting diodes (LEDs), which are configured to emit these given wavelengths. However, because of aging and/or variations of the operating conditions, for example because of a change of temperature, at least one of these LEDs may emit light at a wavelength different from a wavelength that is expected. This may result in an ineffective sanitization of the surface and/or in a hazard for a user. For example, when the light effectively emitted by the LEDs comprises a wavelength in the ultraviolet (UV) region A (UVA) range, that is in a range from 315 nm to 400 nm, the emitted light is dangerous for the health of the user.

According to an example, all the LEDs may emit light at wavelengths which are shifted compared to the expected wavelengths. According to another example, one of the LEDs may emit light at a wavelength different from the one that is expected or may emit light at the expected wavelength but with an intensity which is not high enough to sanitize the surface.

It is here provided a method and a device for sanitization of a surface using light emitted by LEDs at specific or given wavelengths, also called sanitization wavelengths, wherein the light emitted by the LEDs is monitored or measured with a light sensor, for example an ambient light sensor, which provides at least one feedback signal to a circuit, and wherein the circuit controls the LEDs based on the feedback signal(s).

According to one embodiment, the circuit is configured to detect a shift in the wavelengths emitted by the LEDs, and to adapt the LEDs control for suppressing this wavelengths shift, for example, by adapting, for each LED, a value of a current flowing through the LED.

For example, the detection of a shift in the wavelengths emitted by the LEDs is performed based on the feedback signal provided by the light sensor while the LEDs are emitting light (LEDs on), that is the feedback signal representative, for each of a plurality of wavelengths the sensor is sensitive to, of the intensity of light received by the sensor when LEDs emit light.

For example, when the wavelengths are shifted toward the UVA, controlling the LEDs to suppress the wavelengths shift protects the user from receiving UVA light, which is dangerous for its health. As another example, when a shift of the emitted wavelengths toward the UVA is detected, the light emission by the LEDs is stopped.

According to one embodiment, the circuit is configured to detect that one of the expected wavelengths is not emitted by the LEDs, and to stop the light emission and/or to alert a user that the sanitization is ineffective.

For example, the detection that one of the wavelengths is not emitted is performed based on the feedback signal provided by the light sensor.

For example, stopping the light emission and/or alerting the user prevent the user from wrongly believing that the sanitization was effective.

For example, a missing wavelength in the emitted light may result from a shift in the wavelengths emitted by the LEDs which is not corrected, and stopping the light emission protects the user from receiving UVA light.

According to one embodiment, the circuit is configured to adapt the control of the LEDs in order to keep the power consumption as low as possible while ensuring an effective sanitization, for example by adapting, for each LED, a value of the current flowing through the LED and/or by changing a duration during which LEDs emit light.

For example, the modification of the light emitting duration is performed so that, at each of the given wavelengths, a power of the light received at the end of the light emission by the light sensor is equal or superior to a target value, the target value being determined to keep the power consumption as low as possible while ensuring an effective sanitization.

For example, such a modification of the light emission duration is performed after each modification of the current(s) flowing through the LEDs. For example, a current increase, respectively decrease, is followed by a decrease, respectively an increase, of the duration of the light emission by the LEDs.

Complementarily or alternatively, such a modification of the duration of the light emission is, for example, performed based on the feedback signal provided by the light sensor when LEDs emit light (LEDs on) and, preferably, on a supplementary feedback signal provided by the light sensor when no light is emitted (LEDs off), that is the feedback signal which is representative, for each of a plurality of wavelengths the sensor is sensitive to, of the intensity of the light received by the sensor when the LEDs are off. For example, the circuit is configured to determine the intensity of the ambient light for each of the given wavelengths based on the supplementary feedback signal, and to adapt the duration of the light emission consequently. For example, the circuit adapt the duration of the light emission so that, at the end of the light emission, for each of the given wavelengths, the power of the light emitted by the LEDs added to the power of the ambient light is equal or superior to the target value.

Embodiments of such device and method for sanitization of a surface using light will be described in relation with FIGS. 1 to 8.

Figure 1:
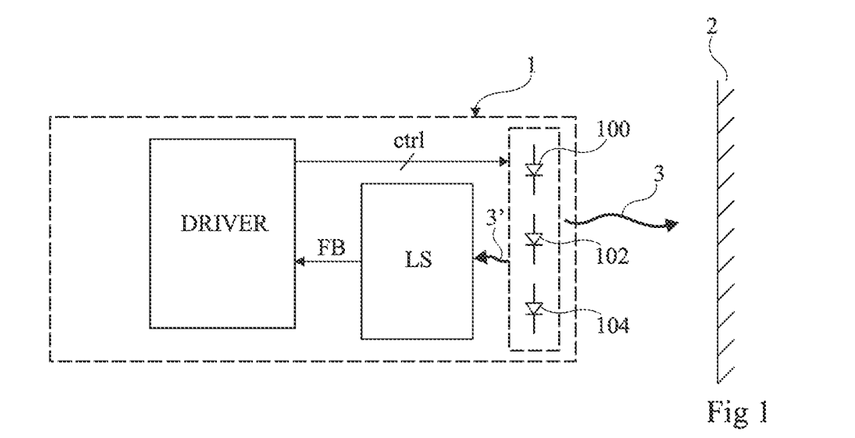
FIG. 1 illustrates an embodiment of a device for sanitization of a surface using light.

FIG. 1 illustrates an embodiment of a device 1 for sanitization of a surface 2 using light 3.

The device 1 comprises a plurality of LEDs, for example three LEDs 100, 102 and 104 in FIG. 1, configured to emit light 3 at the given sanitization wavelengths which allow the surface 2 to be sanitized. For example, LED 100 is configured to emit light at a wavelength equal to 405 nm, LED 102 is configured to emit light at a wavelength equal to 410 nm and LED 104 is configured to emit light at a wavelength equal to 415 nm. Although not detailed in FIG. 1, the LEDs 100, 102 and 104 may be associated with each other in series and/or in parallel. The number of LEDs configured to emits light 3 at the given wavelengths may be different from three, for example may be lower or higher than three.

The device 1 further comprises a circuit DRIVER. The circuit DRIVER is configured to control the LEDs 100, 102, 104. For example, circuit DRIVER is configured to control when the LEDs emit light and/or the duration of the light emission by the LEDs and/or the intensity of the light emitted by the LEDs and/or the wavelengths of the light emitted by the LEDs. For example, the circuit DRIVER is configured to provide one or more control signal ctrl to the LEDs 100, 102 and 104. For example, the signal(s) ctrl determines a voltage and/or a current across each LED 100, 102, 104.

The device 1 further comprises a light sensor LS. The light sensor LS is, for example, an ambient light sensor although it will be apparent for those skilled in the art that other types of light sensors may be used. The sensor LS is configured to receive a part 3' of the light 3 emitted by the LEDs 100, 102, 104, that is a part of the light emitted by each LED 100, 102, 104. The sensor LS is configured to provide at least one feedback signal FB to the circuit DRIVER. For example, for each of a plurality of wavelengths the sensor LS is sensitive to, said plurality of wavelengths preferably comprising the sanitization wavelengths, a first signal FB indicates to circuit DRIVER the intensity of light received by the sensor when the LEDs 100, 102 and 104 are on, thus allowing the circuit DRIVER to know the intensity of the light received by the sensor when the LEDs are on. Preferably, for each of the plurality of wavelengths the sensor LS is sensitive to, a second signal FB indicates to the circuit DRIVER the intensity of light received by the sensor when the LEDs 100, 102 and 104 are off. For example, signal(s) FB are digital signals.

The circuit DRIVER is configured to control the LEDs based on the signal(s) FB, and, more particularly, based at least on the signal FB when LEDs are on.

According to one embodiment, the circuit DRIVER is configured to detect, based on the feedback signal FB when LEDs 100, 102 and 104 are on, that one of the expected wavelengths was not emitted by the LEDs 100, 102 and 104, and to stop the light emission by the LEDs in response to this detection. This detection may be performed by comparing, for each of the sanitization wavelengths, the intensity of the light with a threshold, for example by detecting that the light intensity was above a threshold. These thresholds may be stored in a memory, for example in a non-volatile memory (not illustrated) of the circuit DRIVER.

According to one embodiment, when circuit DRIVER detects that an expected wavelength was not emitted by LEDs 100, 102, 104, the circuit DRIVER is configured to stop the light emission, and/or to alert the user that a default has occurred in the sanitization process.

According to one embodiment, the circuit DRIVER is configured to detect, based on the feedback signal FB when LEDs 100, 102 and 104 are on, that LEDs 100, 102 and 104 emit light with wavelengths which are shifted compared to the expected wavelengths. Those skilled in the art are capable of implementing the circuit DRIVER so that circuit DRIVER detects such a wavelengths shift, for example based on the signal FB when LEDs 100, 102 and 104 are on, and, for example, further based on the signal FB when LEDs 100, 102 and 104 are off. For example, this detection may be performed by comparing the intensity of the light received by the sensor LS at a plurality of wavelengths the sensor is sensitive to with a pattern of intensity, for example corresponding to the expected pattern of intensity of the light emitted by the LEDs 100, 102 and 104, and by detecting that this pattern does not correspond to the expected wavelengths. This light intensity pattern for example corresponds to a set of thresholds. These thresholds may be stored in a memory, for example a non-volatile memory (not illustrated) of circuit DRIVER. For example, this detection may be performed by detecting that the intensity of the light received by the sensor LS in a first range of wavelengths has decreased, for example below a threshold corresponding to this first range of wavelengths, whereas, in the same time, the intensity of the light received by the sensor LS in a second range of wavelengths has increased, for example above a threshold corresponding to this second range of wavelengths and/or for example by a quantity corresponding to the decrease of the light intensity in the first range of wavelengths, thus indicating a wavelengths shift from the first range of wavelengths toward the second range of wavelengths. For example, the first range of wavelengths comprises at least one of the sanitization wavelengths and the second range of wavelengths comprises wavelengths in the UVA domain or range.

According to one embodiment, when circuit DRIVER detects a shift in the wavelengths of the light 3 emitted by LEDs 100, 102, 104, the circuit DRIVER is configured to modify the control of the LEDs to suppress this wavelengths shift, for example by increasing or decreasing the current(s) flowing through LEDs 100, 102 and 104 in consequence. For example, when the emitted wavelengths are shifted toward wavelengths higher than those expected, this generally indicates an increase of the operating temperature of the LEDs 100, 102 and 104. Thus, reducing the current(s) flowing through the LEDs allows to reduce the LEDs temperature, and to bring the emitted wavelengths back to the expected sanitization wavelengths.

According to one embodiment, the circuit DRIVER is further configured to modify the duration of light emission by the LEDs, for example following a modification of the current(s) flowing through the LEDs 100, 102, 104 and/or based on the feedback signal FB when LEDs are on and/or based on the feedback signal FB when LEDs are off. More particularly, the circuit DRIVER is configured to modify the duration of light emission so that, for each of the expected wavelengths, the power of the light received by the sensor LS at the end of the light emission is equal to a target value. For example, the circuit DRIVER determines, at each of the expected wavelengths and based on the feedback signal FB when LEDs are off, the contribution to the power of the light received by the sensor LS during an illumination phase which comes from the ambient light. When this contribution increases, respectively decreases, the circuit DRIVER for example decreases, respectively increases, the duration of the light emission, so that, for each sanitization wavelength, the power of the light received by the sensor LS during the phase of light emission stays superior or equal to a target value ensuring the sanitization is effective, while keeping this power as close as possible, preferably equal, to the target value for reducing the power consumption.

In the embodiment of FIG. 1, the sensor LS is disposed close to the LEDs 100, 102 and 104, for example on the same printed circuit board than the LEDs 100, 102 and 104. In such an embodiment, preferably, the signal(s) FB are transmitted from the sensor LS to the circuit DRIVER using a wired connection.

Although this is not represented in FIG. 1, the device 1 may comprise other LEDs which are configured to emit light with wavelengths different from the wavelengths used for the sanitization, for example to emit white light. Thus, the device 1 may serve as a light source further to being used for the sanitization. These supplementary LEDs are preferably controlled by the circuit DRIVER. For example, the supplementary LEDs may be controlled to emit light while LEDs 100, 102 and 104 do not emit light and/or while LEDs 100, 102 and 104 emit light.

Figure 2:
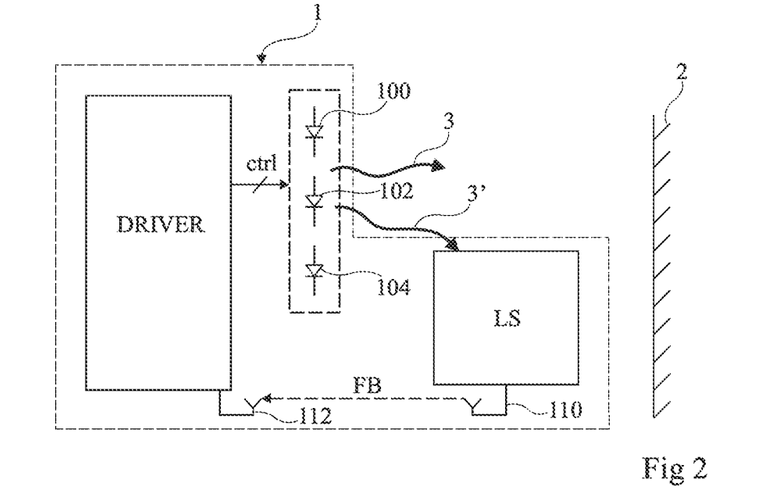
FIG. 2 illustrates an alternative embodiment of the device of FIG. 1.

FIG. 2 illustrates an alternative embodiment of the device 1 of FIG. 1.

In particular, the device 1 of FIG. 2 differs from the device 1 of FIG. 1 only by the fact that the sensor LS is not disposed close to the LEDs 100, 102 and 104. Indeed, in FIG. 2, the sensor LS and the circuit DRIVER are linked with each other using a wireless connection or link. Thus, the signal(s) FB are wirelessly transmitted from the sensor LS to the circuit DRIVER. For example, the signal(s) FB are emitted by the sensor LS using an antenna 110 of the circuit LS, and are received by the circuit DRIVER using an antenna 112 of the circuit DRIVER.

Using a wireless link between circuits DRIVER and LS allows to dispose the sensor LS close to the surface 2 to be sanitized, for example on and in contact with the surface 2. Said in other words, the sensor LS is configured to be disposed close to the surface 2, for example in contact with the surface 2. Thus, the feedback signal FB when LEDs 100, 102 and 104 are on is representative of the light 3 received by the surface 2, for example of the power received at each of the expected wavelengths by the surface 2 during an illumination phase, with a better accuracy than when the sensor LS is disposed close to the LEDs 100, 102 and 104 as previously described in relation with FIG. 1.

Figure 3:
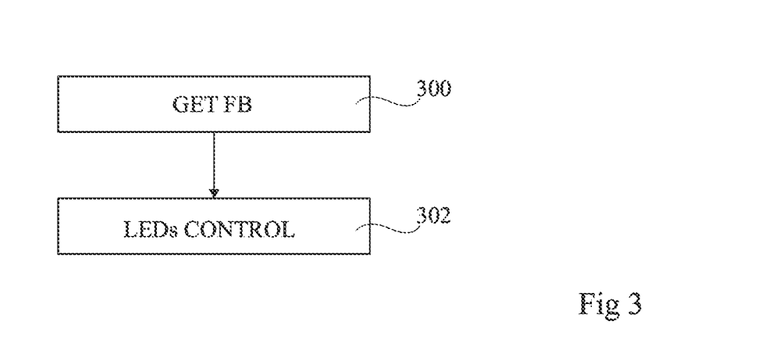
FIG. 3 illustrates an embodiment of a method for sanitization of a surface using light.

FIG. 3 illustrates an embodiment of a method for sanitization of a surface using light, the method being for example implemented in the device 1 described in relation with FIG. 1 or 2.

The method illustrated by FIG. 3 comprises a step 300 ("GET FB"). This step 300 consists of receiving, by the circuit DRIVER, at least the signal FB acquired when LEDs 100, 102 and 104 are on. According to one embodiment, step 300 further consists of receiving, by the circuit DRIVER, the signal FB acquired when LEDs 100, 102 and 104 are off.

For example, step 300 is performed each time a sanitization of surface 2 is required. For example, a sanitization of surface 2 is performed, thus required, periodically and/or each time a user requests a sanitization of surface 2.

For example, during step 300, the circuit DRIVER controls the beginning of a phase of light emission by LEDs 100, 102 and 104.

The method further comprises a step 302 ("LEDs CONTROL"), which is for example implemented after step 300. Step 302 consists of controlling, with the circuit DRIVER, for example with at least one signal ctrl, the LEDs 100, 102 and 104, based on the signal(s) FB received during step 300. During step 302, the circuit DRIVER controls the LEDs as indicated previously, to ensure the sanitization of the surface and/or to prevent risk for the health of the user and/or to keep the power consumption as low as possible.

For example, step 302 is performed after each implementation of the step 300.

For example, as long as LEDs 100, 102 and 104 emit light, step 302 is followed by step 300, such that steps 300 and 302 are performed a plurality of times during this phase of light emission by the LEDs 100, 102 and 104. The fact that steps 300 and 302 are performed several times during a phase of light emission by the LEDs 100, 102 and 104 ensures a continuous adaptation of the control of LEDs 100, 102 and 104 by the circuit DRIVER.

Figure 4:
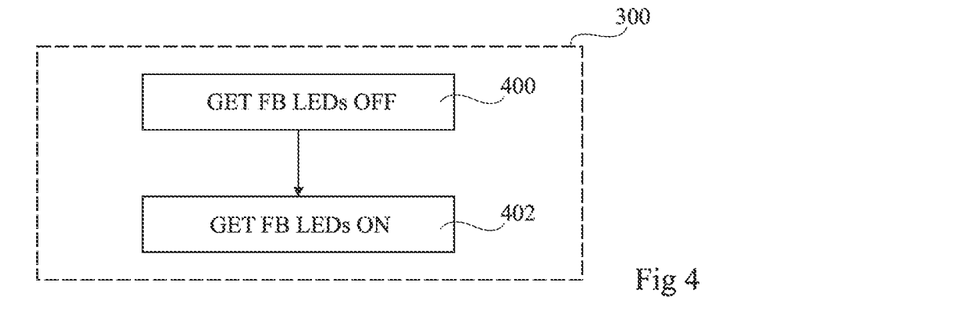
FIG. 4 illustrates an example embodiment of a step of the method of FIG. 3.

FIG. 4 illustrates an example embodiment of the step 300 of the method of FIG. 3.

In the embodiment of FIG. 4, step 300 comprises a step 400 ("GET FB LEDs OFF") and a step 402 ("GET FB LEDs ON").

Step 400 is optional and consists of receiving, by the circuit DRIVER, the signal FB acquired when LEDs 100, 102 and 104 are off, or, said differently, the signal FB representative of the light received by the sensor LS when no light is emitted by the LEDs 100, 102 and 104. For example, step 400 is implemented only once for each phase of light emission by the LEDs 100, 102 and 104, before the beginning of this phase.

Figure 5:
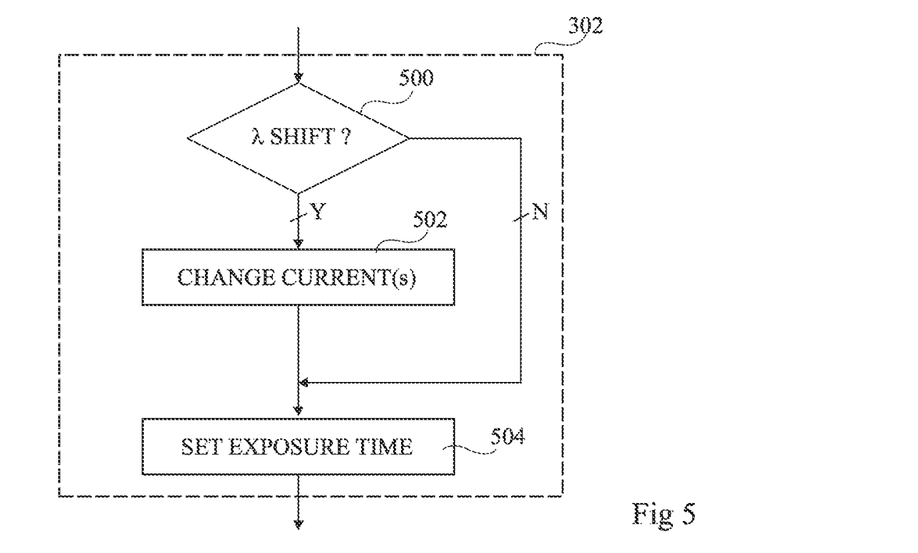
FIG. 5 illustrates an example embodiment of another step of the method of FIG. 3.

FIG. 5 illustrates an example embodiment of step 302 of the method of FIG. 3.

In this embodiment, step 300 begins with a step 500 ("λ SHIFT ?") consisting of detecting, with the circuit DRIVER and based on signal FB acquired when LEDs 100, 102 and 104 are on, if the wavelengths emitted by the LEDs are shifted compared to the wavelengths the LEDs are expected to emit.

If the circuit DRIVER detects such a wavelengths shift (branch Y of bloc 500), at a next step 502 ("CHANGE CURRENT(s)"), the circuit DRIVER modifies the control of the LEDs 100, 102, 104 in order to suppress this wavelengths shift. For example, if the circuit DRIVER detects that wavelengths emitted by the LEDs 100, 102 and 104 are shifted toward greater wavelengths than those expected, the circuit DRIVER controls, for example via a change in signal(s) ctrl, a decrease of the current(s) flowing through the LEDs to keep back the emitted wavelengths to the sanitization wavelengths. Symmetrically, if the circuit DRIVER detects that wavelengths emitted by the LEDs are shifted toward lower wavelengths than those expected, the circuit DRIVER controls, for example via a change in signal(s) ctrl, a decrease of the current(s) flowing through the LEDs to keep back the emitted wavelengths to the sanitization wavelengths.

Optionally, step 502 is followed by a step 504 ("SET EXPOSURE TIME"). Step 504 consists in changing, with circuit DRIVER, the duration of the light emission by the LEDs 100, 102, 104, so that, at each of the expected wavelengths, the power of the light received by the sensor LS during a phase of light emission is equal or superior to a target value. Indeed, an increase of the current at step 502 without decreasing consequently the exposure time may result in killing all the bacteria which are present on surface 2, which may be not desired. Symmetrically, a decrease of the current at step 502 without increasing the exposure time may results in the surface 2 receiving not enough power at the wavelengths used for the sanitization, and, thus, to an ineffective sanitization of the surface 2.

Furthermore, or alternatively, step 504 consists in adapting the exposure time, that is the duration of the light emission by LEDs 100, 102 and 104, based on the signal FB acquired when LEDs 100, 102 and 104 are on and on the signal FB acquired when LEDs 100, 102 and 104 are off. For example, as already indicated before, the circuit DRIVER determines, for each sanitization wavelength, the contribution of the ambient light in the power of the light received by the sensor LS during the exposure time, based on the signal FB acquired when LEDs are off, and then adapts the control of LEDs 100, 102 and 104 based on this ambient light contribution to decrease the power consumption while ensuring the sanitization.

Referring back to step 500, if the circuit DRIVER detects no wavelengths shift (branch N of bloc 500), the step 502 is skipped, and step 500 is followed by the optional step 504.

Figure 6:
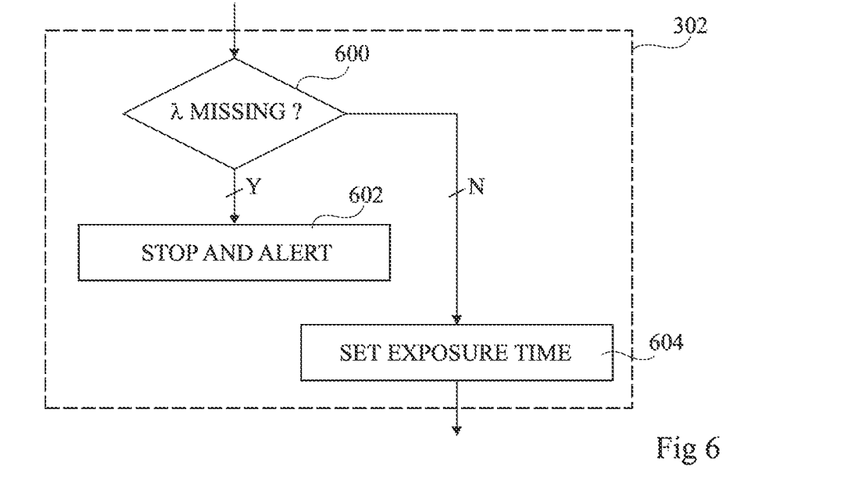
FIG. 6 illustrates another example embodiment of the other step of the method of FIG. 3.

FIG. 6 illustrates another example embodiment of the step 302 of the method of FIG. 3.

In this embodiment, step 302 begins with a step 600 ("λ MISSING ?") consisting in detecting, with the circuit DRIVER and based on the signal FB acquired when LEDs 100, 102 and 104 are on, if at least one of the sanitization wavelengths is not emitted by the LEDs 100, 102, 104. Indeed, such a missing wavelength leads to an ineffective sanitization. For example, step 600 consists of comparing, for each expected wavelength and based on the signal FB acquired when LEDs are on, if the light intensity received by the sensor LS is above a threshold, a wavelength being considered as not emitted, for example, when the intensity is below the threshold.

If the circuit DRIVER detects that an expected wavelength is not emitted (branch Y of the bloc 600), at a following step 602 ("STOP AND ALERT"), the circuit DRIVER alerts the user that sanitization is not effective and/or stops the light emission by LEDs 100, 102, 104. In particular, the detection that an expected wavelength is not emitted may indicate a shift of the emitted wavelengths, which may be dangerous for the health of the user when the shifted wavelengths belong to the UVA range.

If the circuit DRIVER detects that all the expected wavelengths are emitted by the LEDs 100, 102 and 104 (branch N of the bloc 600), step 600 is followed by an optional step 604 ("SET EXPOSURE TIME"). Step 604 is similar to step 504 described in relation with FIG. 5.

Embodiments of FIGS. 5 and 6 may be combined with each other.

Figure 7:
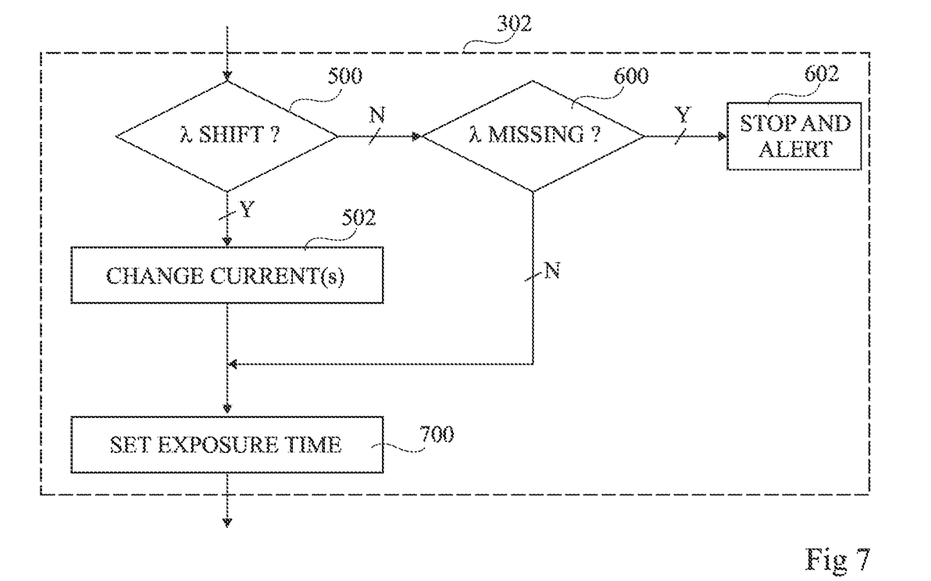
FIG. 7 illustrates yet another example embodiment of the other step of the method of FIG. 3.

FIG. 7 illustrates yet another example embodiment of the step 302 of the method of FIG. 3. More specifically, the embodiment illustrated by FIG. 7 corresponds to an example of a combination of the embodiments described in relation with FIGS. 5 and 6.

In the example of FIG. 7, step 302 begins with step 500.

If a wavelengths shift is detected (branch Y of bloc 500), step 500 is followed by step 502. Step 502 is followed by an optional step 700 ("SET EXPOSURE TIME") similar or identical to steps 504 and 604 described respectively in relation with FIGS. 5 and 6.

If no wavelengths shift is detected (branch N of bloc 500), step 500 is followed by step 600.

At step 600, if the circuit DRIVER detects that an expected wavelength needed for the sanitization is not emitted by the LEDs 100, 102 and 104 (branch Y of bloc 600), step 600 is followed by step 602. If not (branch N of bloc 600), step 600 is followed by the optional step 700.

In the embodiments described in relation with FIGS. 5, 6 and 7, those skilled in the art are capable of changing the order and/or the number of steps. Indeed, the control the LEDs 100, 102 and 104 based on the feedback signal FB acquired when LEDs are on, and, preferably further based on the feedback signal FB acquired when LEDs 100, 102 and 104 are off, is not limited to the examples embodiments given in relation with FIGS. 3, 4, 5, 6 and 7. In particular, those skilled in the art are capable, based on the above description, to implement alternative methods for detecting, based on the feedback signal(s), an issue in the wavelengths emitted for sanitizing the surface 2, and, in response to this detection, for changing the control of the LEDs to solve this issue or stopping the light emission and alerting the user when this issue is not corrected.

For example, although this is not illustrated in FIGS. 5 and 7, the method may further comprise a step of verifying that, after step 502, the wavelengths shift was suppressed, for example based on a new signal FB acquired while LEDs are on. In case the shift is not suppressed, the device 1 may alert the user that sanitization is not effective and/or stop the light emission by the LEDs 100, 102 and 104, for example to avoid risk for the health of the user, for example when the wavelengths emitted by the LEDs are shifted in the UVA range.

For example, during a given phase of light emission by LEDs 100, 102 and 104, the steps 300 and 302 may be implemented a given number of times, and, if after this given number of implementations of steps 300 and 302 the circuit DRIVER still detects a wavelengths shift, the method may comprise a step similar to step 602 described in relation with FIGS. 6 and 7.

Figure 8:
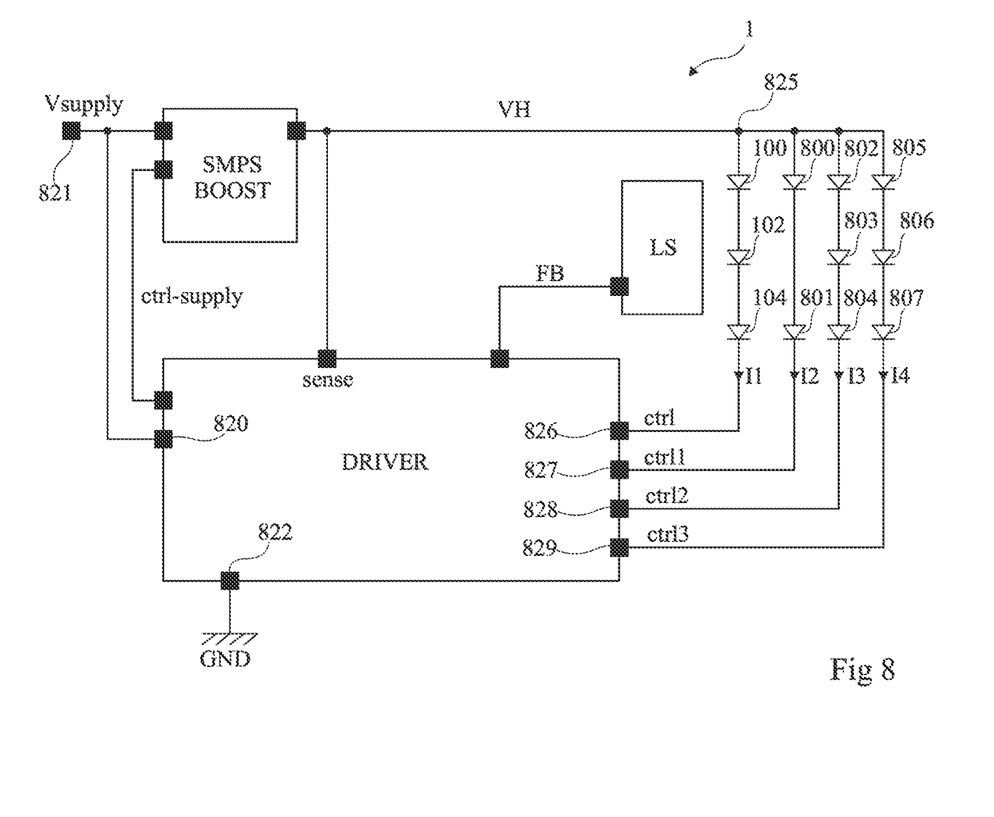
FIG. 8 illustrates a more detailed example embodiment of the device of FIG. 1.

FIG. 8 illustrates a more detailed example embodiment of the device 1 of FIG. 1.

In the embodiment of FIG. 8, device 1 is for example supplied by a potential Vsupply, for example positive and referenced to a reference potential, for example the ground GND. For example, the circuit DRIVER comprises an input 820 coupled, for example connected to an input 821 of device 1 configured to receive the potential Vsupply, the circuit DRIVER comprising an input 822 configured to receive the reference potential GND.

In the embodiment of FIG. 8, the sensor LS is for example disposed close to the LEDs 100, 102 and 104, and is linked to the circuit DRIVER by a wire connection, although, in another example not illustrated, the sensor LS is disposed close to a surface to be sanitized and is linked to the circuit DRIVER by a wireless link.

In the embodiment of FIG. 8, the device 1 for example comprises supplementary LEDs 800, 801, 802, 803, 804, 805, 806 and 807 configured to emit light with wavelengths different from the wavelengths the LEDs 100, 102 and 104 are configured to emit to sanitize a surface using light. In this example, LEDs 800 to 807 are controlled by the circuit DRIVER.

More specifically, in the example of FIG. 8, LEDs 100, 102 and 104 are connected in series between a node 825 configured to receive a potential VH and an output 826 of circuit DRIVER, LEDs 800 and 801 are connected in series between node 825 and an output 827 of the circuit DRIVER, LEDs 802, 803 and 804 are connected in series between node 825 and an output 828 of circuit DRIVER, and LEDs 805, 806 and 807 are connected in series between node 825 and an output 829 of circuit DRIVER.

The potential VH is, for example, higher than the potential Vsupply, and is, for example, provided by circuit SMPS BOOST of the device 1. For example, the circuit SMPS BOOST is a switched mode power supply of the boost type. The circuit SMPS BOOST, that is the value of the potential VH, is for example controlled by the circuit DRIVER, for example by a signal ctrl-supply provided by the circuit DRIVER to the circuit SMPS BOOST. The signal ctrl-supply is, for example, representative of a difference between a target value of the potential VH and the current value of the potential VH. The current value of the potential VH is, for example, sensed by the circuit DRIVER, for example by an input sense of the circuit DRIVER, the input sense being configured to receive the potential VH.

The output 826 is configured to provide the signal ctrl. For example, the signal ctrl is a potential having a value determining the value of a current I1 flowing through the LEDs 100, 102 and 104. For example, the anodes of the LEDs 100, 102 and 104 are on the side of the node 825, and the potential ctrl is lower than the potential VH. Thus, during a phase of light emission by the LEDs 100, 102 and 104, the difference between potentials VH and ctrl determines the voltage between node 825 and output 826, and, thus, the current I1. For example, when the LEDs 100, 102 and 104 are controlled by circuit DRIVER in order to not emit light, output 826 may be in high impedance state, or, said otherwise, in a floating state.

In the example of FIG. 8, the output 827 is configured to provide a potential ctrl1 determining a value of a current I2 flowing through the LEDs 800 and 801. For example, the anodes of the LEDs 800 and 801 are on the side of node 825, and the potential ctrl1 is lower than potential VH. The difference between potentials VH and ctrl1 determines the current I2. For example, when the LEDs 800 and 801 are controlled by circuit DRIVER in order to not emit light, output 827 may be in high impedance state, or, said otherwise, in a floating state. For example, when the LEDs 800 and 801 are controlled by circuit DRIVER in order to not emit light, output 827 may be in high impedance state, or, said otherwise, in a floating state.

In the example of FIG. 8, the output 828 is configured to provide a potential ctrl2 determining a value of a current I3 flowing through the LEDs 802, 803 and 804. For example, the anodes of the LEDs 802, 803 and 804 are on the side of node 825, and the potential ctrl2 is lower than potential VH. The difference between potentials VH and ctrl2 determines the current I3. For example, when the LEDs 802, 803 and 804 are controlled by circuit DRIVER in order to not emit light, output 828 may be in high impedance state, or, said otherwise, in a floating state.

In the example of FIG. 8, the output 829 is configured to provide a potential ctrl3 determining a value of a current I4 flowing through the LEDs 805, 806 and 807. For example, the anodes of the LEDs 805, 806 and 807 are on the side of node 825, and the potential ctrl3 is lower than potential VH. The difference between potentials VH and ctrl3 determines the current I4. For example, when the LEDs 805, 806 and 807 are controlled by circuit DRIVER in order to not emit light, output 829 may be in high impedance state, or, said otherwise, in a floating state.

The described embodiments of device 1 are not limited to the example embodiment of FIG. 8. Indeed, the circuit SMPS BOOST may be omitted, the potential VH being then lower or equal to potential Vsupply. On the contrary, device 1 may comprise a plurality of circuits SMPS BOOST, such that a first circuit SMPS BOOST provides the high potential VH to the LEDs 100, 102 and 104, and at least a second circuit SMPS BOOST provides at least one another high potential to LEDs 800 to 807. Furthermore, although in the example of FIG. 8 the LEDs 100, 102 and 104 are connected in series and controlled by the same potential ctrl, in other examples not illustrated, each LED 100, 102, 104 is connected between the node 825 and a respective output of the circuit DRIVER configured to provide a corresponding control potential to the cathode of the LED, such that each LED 100, 102 and 104 may be controlled independently from the other LEDs. More generally, other series and/or parallel configurations of the LEDs 100, 102 and 104 and of the LEDs 800 to 807 may be contemplated by those skilled in the art. In particular, as already indicated in relation with FIG. 1, the device 1 may comprise more than three LEDs or less than three LEDs configured to emit wavelengths required for sanitization of a surface using light.

Various embodiments and variants have been described. Those skilled in the art will understand that certain features of these embodiments can be combined and other variants will readily occur to those skilled in the art. In particular, the described embodiments are not limited to the case were the sanitization wavelengths are comprised in the range from 400 nm to 420 nm.

Finally, the practical implementation of the embodiments and variants described herein is within the capabilities of those skilled in the art based on the functional description provided hereinabove. In particular, those skilled in the art are capable of designing the circuit DRIVER to implements the method previously described for controlling LEDs which emit light for sanitizing a surface.

A method for sanitization of a surface (2) by emission of a plurality of sanitization wavelengths, may be summarized as including emitting light (3) using first LEDs (100, 102, 104) configured to emit said sanitization wavelengths; receiving, by a circuit (DRIVER), a feedback signal (FB) from a light sensor (LS) indicating a light intensity received by the light sensor (LS) during the light emission; and controlling the first LEDs (100, 102, 104) with the circuit (DRIVER) based on the feedback signal (FB).

The method may include detecting (600), with the circuit (DRIVER) and based on the feedback signal (FB), that at least one of said sanitization wavelengths was not emitted by the first LEDs (100, 102, 104); and in response to the detection that at least one of said sanitization wavelengths was not emitted, controlling (602) with the circuit (DRIVER) an end of the light emission by the first LEDs (100, 102, 104).

The method may further include alerting (602) a user in response to the detection (600) that at least one of said sanitization wavelengths was not emitted.

Detecting (600) that at least one of said sanitization wavelength was not emitted may include, for each sanitization wavelength, comparing with a threshold an intensity of the light received by the light sensor (LS) at said sanitization wavelength.

The method may include detecting (500), with the circuit (DRIVER) and based on the feedback signal (FB), that the first LEDs (100, 102, 104) emit light with wavelengths shifted compared to said sanitization wavelengths; and modifying (502), with the circuit (DRIVER), the control of the first LEDs (100, 102, 104) to suppress the wavelengths shift.

Suppressing the wavelengths shift may include modifying, with the circuit (DRIVER) and for each first LED (100, 102, 104), a current (I1) flowing through said first LED (100, 102, 104) when said first LED (100, 102, 104) emits light.

Detecting (500) that wavelengths emitted by the first LEDs (100, 102, 104) may be shifted compared to said sanitization wavelengths comprises comparing, with a pattern of intensity, an intensity of the light received by the sensor (LS) when said first LEDs (100, 102, 104) emit light.

The method may further include receiving (400), by the circuit (DRIVER), a supplementary feedback signal (FB) provided by the light sensor (LS) which indicates a light intensity received by the light sensor (LS) when no light is emitted by the first LEDs (100, 102, 104), and the control of the first LEDs by the circuit (DRIVER) may be further based on said supplementary feedback signal (FB).

The circuit (DRIVER) may modify a duration (504, 604, 700) of the light emission by the first LEDs (100, 102, 104) so that, for each of said sanitization wavelengths, a power of the light received by the sensor (LS) during the light emission may be equal to a target value.

The circuit (DRIVER) may decrease the duration of the light emission when, for each first LED (100, 102, 104), the circuit controls an increase of the current (I1) flowing through the first LED (100, 102, 104); and the circuit (DRIVER) may increase the duration of the light emission when, for each first LED (100, 102, 104), the circuit (DRIVER) controls a decrease of the current (I1) flowing through the first LED (100, 102, 104).

The circuit (DRIVER), based on the feedback signal and on the supplementary feedback signal (FB) may determine for each of said sanitization wavelengths a contribution of the ambient light to the power of light received by the light sensor (LS) during the light emission by the first LEDs (100, 102, 104); may decrease the duration of the light emission when said contribution increases; and may increase the duration of the light emission when said contribution decreases.

During the light emission by the first LEDs (100, 102, 104), the circuit (DRIVER) may control the light (3) emitted by each first LED by controlling a value of a voltage applied across the first LED.

The method may further include controlling, by the circuit (DRIVER), second LEDs (800, 801, 802, 803, 804, 805, 806, 807) configured to emit light with wavelengths different from said sanitization wavelengths.

Said sanitization wavelengths may include a wavelength range from 400 nm to 420 nm, and, preferably, may include a first wavelength equal to 405 nm, a second wavelength equal to 410 nm and a third wavelength equal to 415 nm.

A device (1) for sanitization of a surface (2) by emission of a plurality of sanitization wavelengths may be summarized as including first LEDs (100, 102, 104) configured to emit said sanitization wavelengths; a light sensor (LS) configured to provide a feedback signal (FB) indicating intensity of the light received by the light sensor (LS) during a phase of light emission by the first LEDs (100, 102, 104); and circuit (DRIVER) configured to receive the feedback signal (FB) and to control the first LEDs (100, 102, 104) based on said feedback signal (FB), wherein the device (1) is preferably configured to implement the method described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   emitting light by first LEDs, the first LEDs being configured to emit the light having a plurality of sanitization wavelengths for sanitizing a surface;
   receiving, by a circuit, a feedback signal, the feedback signal being received from a light sensor and indicating a light intensity detected by the light sensor during the emitting of the light;
   detecting, by the circuit and based on the feedback signal, that at least one of the plurality of sanitization wavelengths was not emitted by the first LEDs by:
      comparing, for each sanitization wavelength of the plurality of sanitization wavelengths, an intensity of light detected by the light sensor at the sanitization wavelength with a threshold; and
   in response to detecting that at least one of the plurality of sanitization wavelengths was not emitted, ending, by the circuit, the emitting of the light by the first LEDs.

2. The method of claim 1, comprising:
   alerting a user in response to detecting that at least one of the plurality of sanitization wavelengths was not emitted.

3. The method of claim 1, comprising:
   detecting, by the circuit and based on the feedback signal, that the first LEDs emit light having wavelengths that are shifted in relation to the plurality of sanitization wavelengths; and
   modifying, by the circuit, the control of the first LEDs to suppress shifting the wavelengths.

4. The method of claim 3, wherein suppressing shifting the wavelengths includes modifying, by the circuit and for each first LED of the first LEDs, a current flowing through the first LED when the first LED emits light.

5. The method of claim 3, wherein detecting that the wavelengths are shifted in relation to the plurality of sanitization wavelengths includes comparing an intensity of the light detected by the light sensor when the first LEDs emit the light with a pattern of intensity.

6. The method of claim 1, comprising:
   receiving, by the circuit, a supplementary feedback signal that is provided by the light sensor and that indicates a light intensity detected by the light sensor when no light is emitted by the first LEDs; and
   controlling, by the circuit, the first LEDs based on the supplementary feedback signal.

7. The method of claim 1, comprising:
   modifying, by the circuit, a duration of emitting the light by the first LEDs to cause, for each of the plurality of sanitization wavelengths, a power of the light detected by the light sensor during emitting the light to be equal to a target value.

8. The method of claim 4, comprising:
modifying, by the circuit, a duration of emitting the light by the first LEDs to cause, for each of the plurality of sanitization wavelengths, a power of the light detected by the light sensor during emitting the light to be equal to a target value;
decreasing, by the circuit, the duration of emitting the light by the first LEDs in response to increasing of the current flowing through the first LED; and
increasing, by the circuit, the duration of emitting the light by the first LEDs in response to decreasing the current flowing through the first LED.

9. The method of claim 7, comprising:
receiving, by the circuit, a supplementary feedback signal that is provided by the light sensor and that indicates a light intensity detected by the light sensor when no light is emitted by the first LEDs;
controlling, by the circuit, the first LEDs based on the supplementary feedback signal;
determining, for each of the plurality of sanitization wavelengths, a contribution of ambient light to a power of the light detected by the light sensor during emitting the light by the first LEDs, wherein determining the contribution of the ambient light is based on the feedback signal and the supplementary feedback signal;
decreasing a duration of emitting the light in response to the contribution of the ambient light increasing; and
increasing the duration of emitting the light in response to the contribution of the ambient light decreasing.

10. The method of claim 1, comprising:
during emitting the light by the first LEDs, controlling, by the circuit, the light emitted by each first LED by controlling a value of a voltage applied across the first LED.

11. The method of claim 1, comprising:
controlling, by the circuit, second LEDs configured to emit light having wavelengths different from the plurality of sanitization wavelengths.

12. The method according to claim 1, wherein the plurality of sanitization wavelengths include a wavelength range from 400 nanometers (nm) to 420 nm.

13. The method according to claim 12, wherein the plurality of sanitization wavelengths include a first wavelength that is 405 nm, a second wavelength that is 410 nm and a third wavelength that is 415 nm.

14. A device, comprising:
first LEDs configured to emit a plurality of sanitization wavelengths for sanitizing of a surface;
a light sensor configured to output a feedback signal indicating an intensity of light detected by the light sensor during a phase of light emission by the first LEDs; and
a circuit configured to:
receive the feedback signal;
detect, by the circuit and based on the feedback signal, that at least one of the plurality of sanitization wavelengths was not emitted by the first LEDs by being configured to:
compare, for each sanitization wavelength of the plurality of sanitization wavelengths, an intensity of light detected by the light sensor at the sanitization wavelength with a threshold; and
in response to detecting that at least one of the plurality of sanitization wavelengths was not emitted, end, by the circuit, the light emission of the first LEDs.

15. The device of claim 14, wherein a user is alerted in response to detecting that at least one of the plurality of sanitization wavelengths was not emitted.

16. The device of claim 14, wherein the circuit is configured to:
detect, based on the feedback signal, that the first LEDs emit light having wavelengths that are shifted in relation to the plurality of sanitization wavelengths; and
modify the control of the first LEDs to suppress shifting the wavelengths.

17. The device of claim 14, wherein the circuit is configured to:
receive a supplementary feedback signal that is provided by the light sensor and that indicates a light intensity detected by the light sensor when no light is emitted by the first LEDs; and
control the first LEDs based on the supplementary feedback signal.

18. The device of claim 14, wherein the circuit is configured to:
detect, by the circuit and based on the feedback signal, that the first LEDs emit light having wavelengths that are shifted in relation to the plurality of sanitization wavelengths; and
modify, by the circuit, the control of the first LEDs to suppress shifting the wavelengths.

19. The device of claim 18, wherein the circuit suppresses shifting the wavelengths by being configured to:
modify, by the circuit and for each first LED of the first LEDs, a current flowing through the first LED when the first LED emits light.

20. A method, comprising:
emitting light by first LEDs, the first LEDs being configured to emit the light having a plurality of sanitization wavelengths for sanitizing a surface;
receiving, by a circuit, a feedback signal, the feedback signal being received from a light sensor and indicating a light intensity detected by the light sensor during the emitting of the light;
detecting, by the circuit and based on the feedback signal, that the first LEDs emit light having wavelengths that are shifted in relation to the plurality of sanitization wavelengths;
modifying, by the circuit, the control of the first LEDs to suppress shifting the wavelengths by:
modifying, by the circuit and for each first LED of the first LEDs, a current flowing through the first LED when the first LED emits light;
modifying, by the circuit, a duration of emitting the light by the first LEDs to cause, for each of the plurality of sanitization wavelengths, a power of the light detected by the light sensor during emitting the light to be equal to a target value;
decreasing, by the circuit, the duration of emitting the light by the first LEDs in response to increasing of the current flowing through the first LED; and
increasing, by the circuit, the duration of emitting the light by the first LEDs in response to decreasing the current flowing through the first LED.

* * * * *